March 30, 1948.  R. C. RUSSELL  2,438,620
CLUTCH AND BRAKE DEVICE FOR A TWO SPEED AXLE CONSTRUCTION
Filed Dec. 10, 1941  2 Sheets-Sheet 1
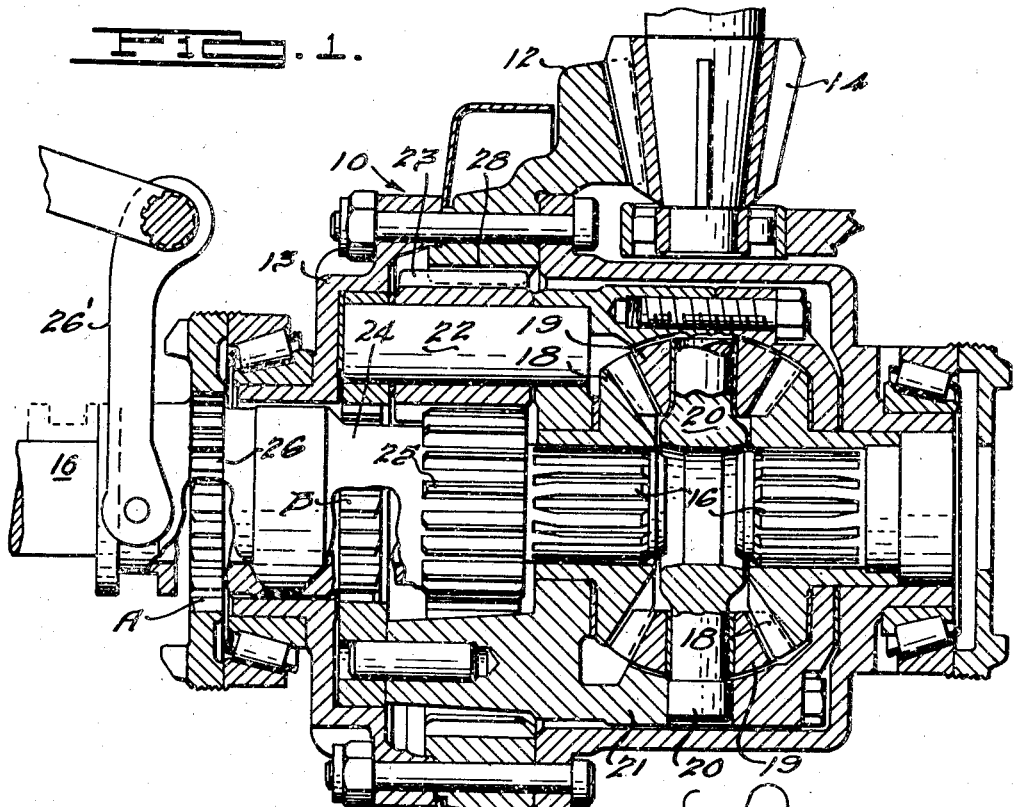
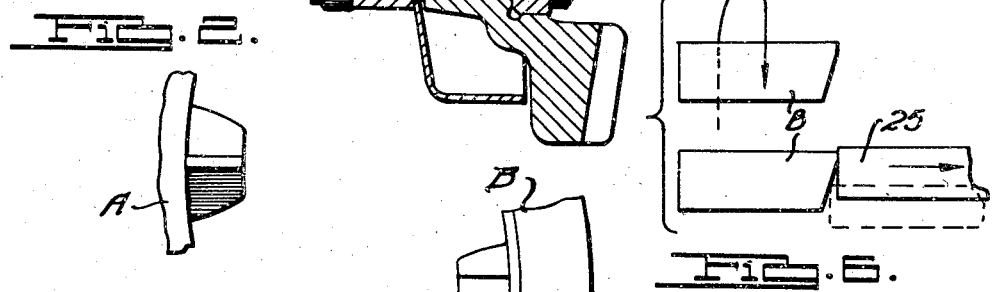
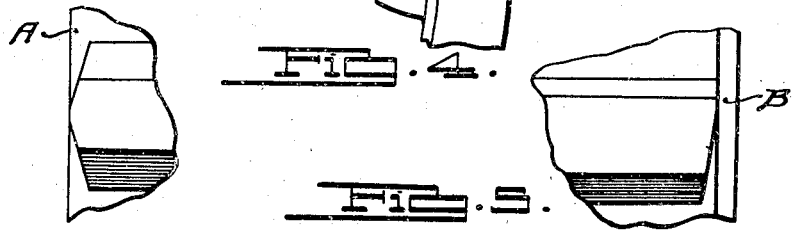
INVENTOR
Robert C. Russell.
BY John F. Stark
ATTORNEY

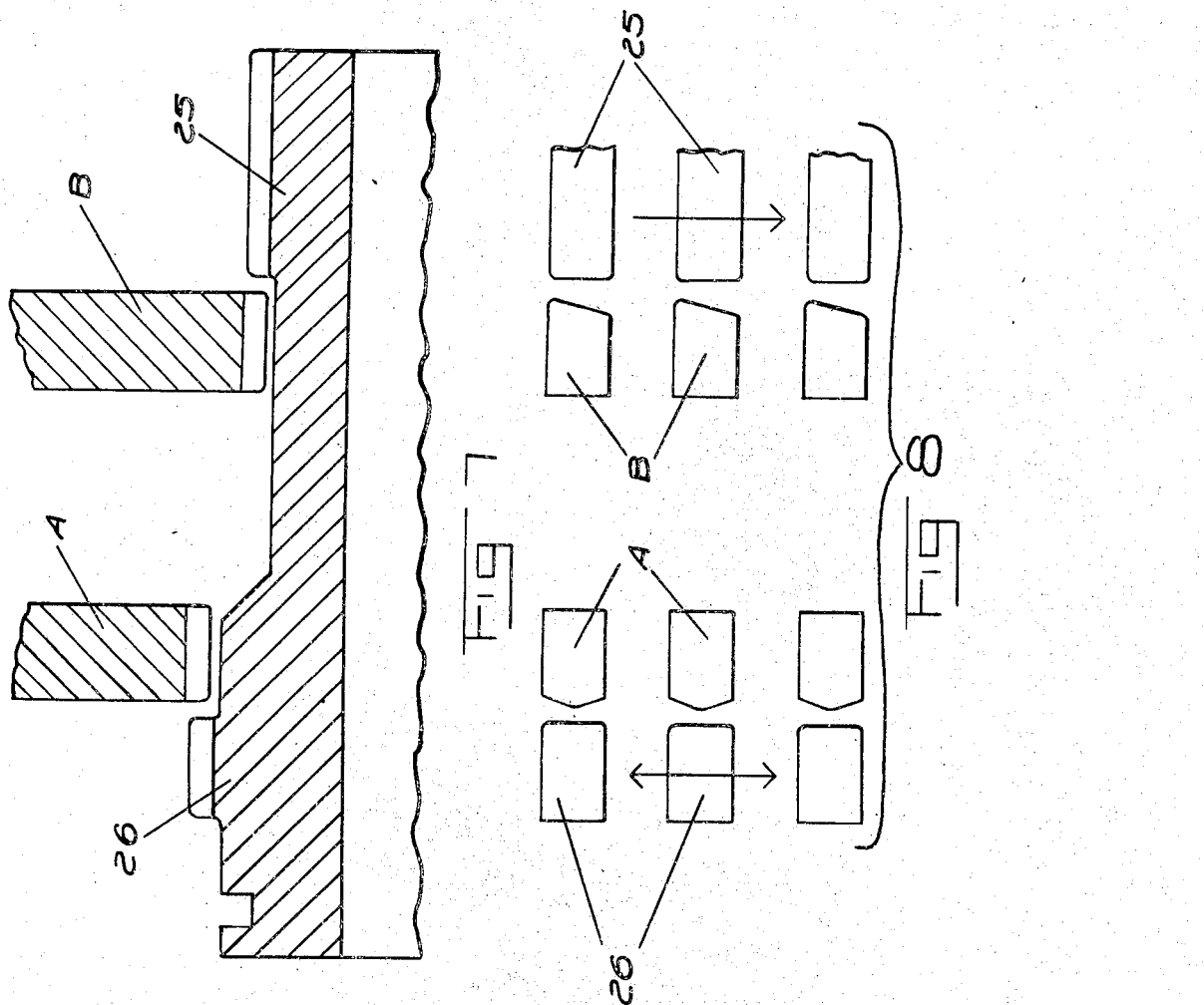

Patented Mar. 30, 1948

2,438,620

UNITED STATES PATENT OFFICE 2,438,620

CLUTCH AND BRAKE DEVICE FOR A TWO-SPEED AXLE CONSTRUCTION

Robert C. Russell, Cleveland Heights, Ohio, assignor to Eaton Manufacturing Company, Cleveland, Ohio, a corporation of Ohio Application December 10, 1941, Serial No. 422,364

5 Claims. (Cl. 192—12)

1

This invention relates to transmission drive mechanisms embodying a change speed mechanism therein, and more particularly, concerns the tooth profile on intermeshable gears in a two-speed axle construction.

Heretofore the change from one speed ratio to another in a two speed axle construction, especially on commercial vehicles where the shift is effected by hand, has been attended by certain unsafe driving practices and more or less noisy shifts caused by gear clashing when intermeshing is effected and consequent wear, tear and strain on the parts in question. More recently the applicant has conceived a certain advance in this general art by his co-pending application, Ser. No. 405,433, filed August 4, 1941, for "Operating system for automotive vehicles," now abandoned. In said application means are disclosed for effecting simultaneous synchronization of the speed change, including the speedometer gear change device in a two-speed axle. That is to say, means for effecting the automatic or manual release of transmission or transfer of torque from the vehicle engine to the change speed mechanisms were disclosed, so that the vehicle wheels could momentarily equal or overrun the engine and synchronization of the gears in the change speed mechanisms be effected, in changing from one axle speed ratio to another. Such means included switch means for momentarily interrupting the transfer of torque from the vehicle engine to the axle, and other means for re-establishing transfer of engine torque after the axle had been changed from one speed ratio to another. Additional means disclosed in said application involved rapidly opening and closing the accelerator in timed relation to effecting a change speed ratio in the axle, or, a declutching movement, along with associated operations, when it was desired to alter the axle speed ratio.

The present invention involves an improvement in the tooth profile of a gear wheel intended to be meshed with a rotating gear, in such a change speed mechanism as generally described above, to effect such intermeshing of the gears with greatly increased smoothness only at synchronized speeds, and to discourage any gear intermesh at other speeds, with a decreased amount of associated means and improved results.

Accordingly, to effect this end, among the objects of the present invention is the provision in a change speed transmission drive mechanism, or like device, of a toothed part having a dental profile adapted to be selectively meshed with a second toothed part only at substantially syn-

2 chronized speeds; the provision in a change speed mechanism, as above described, of a toothed member having a ratchet-like dental profile so contoured as to discourage intermeshing with a second slidable conventionally toothed member unless the two members are at substantially synchronous speeds; the provision in a change speed mechanism, as above described, which comprises a toothed part having a dental profile on at least one face of the teeth so angled off as to intermesh with an associated toothed part only at synchronized speeds between the parts and to be discouraged from effecting an intermesh at all other speeds; the provision in a change speed mechanism, as above described, having a low and high speed ratio including associated intermeshable toothed gear members therein on which at least one of each of the sets of gear ratios has a gear wheel having a dental tooth profile angled off on one face, and the other set has a gear member angled off equally from the center of one edge of the teeth to effect the results claimed, in either direction of rotation, with respect to its mate in one gear ratio.

Another object of the present invention is the provision in a two speed axle construction having a low speed toothed clutch member, a high speed toothed clutch member, and a sliding clutch gear adapted to engage either of said toothed clutch members selectively, of a ratchet-like tooth profile on the low speed clutch member angled off equally from the center of the leading edge of the plate presented to a square tooth edge of the intermeshable sliding clutch gear, and a ratchet-like tooth profile of the high speed clutch member so contoured as to provide an inclined surface on the leading edge presented to a square toothed edge on the intermeshable sliding clutch gear; the provision in a two speed axle construction as described of a toothed profile on one edge of the clutch members, on the side presented to the intermeshable sliding clutch gear, so contoured as to effect a synchro-mesh at predetermined relative speeds therebetween.

Further and other objects and advantages of the invention reside in the novel combination and arrangement of parts about to be described, when taken in conjunction with the drawing, forming a part of this specification, and pointed out with particularity in the appended claims.

In the drawing like reference characters denote corresponding parts in the several views, and wherein:

Fig. 1 is a plan view, partly in section, of a two speed axle construction embodying one form of the present invention; and, Fig. 2 is an end view of a tooth on clutch member A; and, Fig. 3 is a face view of the same tooth on clutch member A; and, Fig. 4 is an end view of a tooth on clutch member B; and, Fig. 5 is a face view of the same tooth on clutch member B; and, Fig. 6 is detail view, somewhat diagrammatically of a tooth on clutch member B and an intermeshable tooth of an associated sliding gear; and, Fig. 7 is a fragmentary sectional view illustrating the intermeshing gears constituting the gist of the invention; and, Fig. 8 is a top plan view illustrating the gear teeth contours and their intermeshing relationship.

The present invention is to be sharply distinguished from conventional gear constructions embodying tooth profiles having rounded, chamfered, or angularly cut-off edges which facilitate intermeshing with an associated gear, including gears of the so-called "synchro-mesh" type, because in such constructions the intermeshability is facilitated regardless of the gear synchronization, except in the above mentioned syncro-mesh type, and the disadvantageous features of such action on the gear structure are present; whereas in this invention meshing of the associated gears are discouraged except under predetermined selected conditions and the resultant operation is substantially smoother and greatly easier on the physical structure of the parts.

The two speed transmission drive axle shown in the drawing is a well known commercial axle modified to embody the present invention and operates in a manner similar to that shown and described in United States Letters Patent Number 1,623,212, and only those parts of the axle which are necessary to the complete understanding of the present invention are herein referred to and described in detail.

Referring to the drawing, particularly Fig. 1, there is shown a two speed axle differential unit assembly, designated generally by the reference numeral 10, and removed from the conventional axle housing (not shown). A ring gear 12 is mounted by the left hand half of the support case 13 of the assembly 10. The complete ring gear assembly is rotatably supported by roller bearings and adapted to be driven by a pinion gear 14, connected to the main drive shaft from the vehicle engine (not shown). Axle shafts 16 extend laterally through the hollow members of the assembly 10 from the center of the differential outwardly to the driving wheels. Mounted upon adjacent ends of the shafts 16 are differential side gears 18 intermeshed with differential pinion gears 19, rotatably mounted upon spider 20 carried by the differential casing 21. The differential casing is formed with openings upon the right and left hand side which journal the casing on the hubs of the pinion side gears 18.

Laterally extended from the left side of the differential casing as shown are pinion studs or shafts 22 on each of which is journalled a pinion gear 23, and are sometimes referred to as idler pinions, since they only transmit the full torque of the secondary ratio of the axle; and constitute the intermediate gears of the planetary system. The outer ends of the studs 22 are pressed in a narrow annular ring or toothed member B, generally referred to as the high speed clutch member, since its clutch teeth are adapted to be engaged by a sliding sun gear 25 provided with square edged spur teeth to lock the planetary pinions 23 to the ring gear casing for rotation together as a unit to provide the high speed drive of the axle. The teeth of said clutch member formed on its inner periphery and the profile of said dental structure form a principal part of this invention, as will be presently described.

The sliding sun gear 25 also includes an integral axially extending sleeve portion 24 journalled in the support case 13, of the differential case 21, and is operated by a shifter fork mechanism 26'. A second internally toothed annular ring member A, generally referred to as the low speed clutch member, has a threaded outer periphery to mount it in a selected fixed position in the differential carrier. Upon the sleeve portion of the sliding sun gear 25 is a second geared periphery 26 which is adapted to mesh with member A, in the position as shown in Fig. 1 of the drawing, to provide for reduced or low axle speeds. The ring gear 12 is formed with an integral, internally toothed, annular portion which provides an orbit gear 28, with which the planetary pinions are constantly meshed, and by means of the sliding sun or clutch gear being moved to the left, as shown in dotted lines in Fig. 1, the toothed clutch members A or B may be brought in mesh therewith, selectively, thus leaving the planetary reduction in an unlocked position, for low axle speeds, or in the locked out position, for high axle speeds, respectively.

As aforementioned the principal object of this invention is to enable better changes from one speed ratio to another in any change speed mechanism, and, in this instance, to effect this end, there is shown in Figs. 2–6 one illustration of an embodiment of the genus of the invention. In Figs. 2 and 3 is shown the end view and face view, respectively, of a tooth from a portion of the low speed clutch member A. It will be noted the tooth has had the leading edge, of that side of the member A presented to the sliding clutch or sun gear 26, removed or angled off equally at substantially, in this instance, a 15° angle from each side of the center line of the tooth. This two way tooth angle is less favorable than a single angle, as shown in Figs. 4 and 5, as will be presently explained; but is necessary because in this instance the sliding gear 26 may be rotating in either direction of rotation relative to the stationary low speed clutch member A, depending upon the speed of the engine and vehicle wheels when shift to low speed is made. Now having reference to Figs. 4 and 5, the portion of the high speed clutch member B shown has the same removal of the leading edge of tooth on the side of the member presented to the advancing sun gear 25, of Fig. 1, but in this case is only cut off one way, as best shown in Fig. 5, so as to present an inclined plane to the intermeshable sun gear, the advantageous function of which is described in the following paragraphs.

In Fig. 6 there is shown, somewhat diagrammatically, a pair of successive teeth, for example, from the high speed clutch member, which are assumed to be moving downward on the sheet as shown by the curved arrow; and a single tooth from the sliding sun or clutch gear 25, of Fig. 1, which is being acted upon so as to move it toward the left, as viewed on the drawing, to the clutch member teeth. As the operator, through means of the shifter lever 26', of Fig. 1, moves the sliding sun gear 25 towards the left and contacts the rotating clutch member teeth, due to the inclined surface of the plane of the edge of the teeth presented thereto, it will always be forced to the right or out of meshing relation, unless the two toothed parts are at or substantially near synchronized speeds, and in that case suitable conditions are present for a smooth and quiet shift. Synchronization is attained between the two members in question by use of any of the means mentioned in applicant's above identified co-pending application or by the simple expedient of the vehicle operator closing the accelerator throttle and opening it gradually. This action accomplishes two functions, namely, it takes the torque or load off the sliding clutch gear and allows it to come to rest to afford freer sliding movement; and also practically instantaneously allows the vehicle wheels to overrun the engine. Just before the overrunning action takes place, the sliding clutch gear is at rest and the high speed clutch plate attains a synchronized speed and the shift may be completed.

To illustrate the striking difference in action between conventional intermeshable gears and the present improved dental profile, as aforementioned, visualize the usual leading edge of such a gear type with a rounded or corner chamfered contour or even the so-called syncro-mesh type. In the types assumed, any substantial relative difference in speed between the two gear parts to be meshed is unfavorable for a smooth shift. As the slidable gear is presented to the second gear for meshing, the rounded or chamfered leading edges of the tooth ends contact at a tangent on one side, slide up the tangent surfaces and down the other peripheral side of the circumference, and the two gears are thus constantly being urged into meshed relation rather than impeded, regardless of relative speeds, and finally the teeth are forced below the point of tangency with the other gear teeth and the shift is completed with a shock and strain on the parts.

Now reverting to the ratchet-like tooth profile on the leading edge of one gear relative to a square edged tooth profile on an intermeshable spur gear, according to the present invention, the engagement retarding action as well as the mesh inducing action will be readily apparent. Assume the gear with the angled off or inclined plane tooth profile, presented to the square edge sliding gear, is rotating the faster of the two, but both in the same direction. At the initial or greatest relative difference between the speed of the two, the sliding square edge spur gear will be contacted repeatedly only at the tip of the leading edge of the inclined tooth profile of the other gear. As the relative differential in speed between the two gears decreases, contact will be established at an intermediate point on the inclined plane of the leading edge of the tooth profile, and finally down to the lower edge or base of the inclined plane of the leading edge. When the two gears have established contact at this recessed line, they have practically reached synchronized speeds and one is about to overtake the other. At this stage, the ratchet-like tooth angle becomes a conductive force in urging or screwing the square edge sliding gear into fully meshed or engaged position. In the present instance where the torque release from the vehicle engine, effected by the operator, results in the sliding sun gear being at rest, this is only a special application of the generic principle, as under the above condition of relative rotation between the gears the tooth form functions equally well.

In the production phase of the tooth form, it may be desirable to form the tooth with a cutter that will give a slightly curved contour in place of the straight angle or inclined plane. It should also be mentioned that although a 15° angle has been proven desirable in the present application in a two speed axle, it may be necessary to change angles for different relative speeds in other applications, such as, in a vehicle passenger car transmission to obviate some phases of de-clutching, without changing the basic principle of the invention; the controlling factor being the right or left hand lead of the angle or inclination of the plane which is definitely dependent upon the direction of rotation.

From the foregoing disclosures it will be apparent there has been revealed a specific application of the invention incorporating the objects and advantages first enumerated. However, it is not intended to be limited to this specie of the broad invention, as many modifications will be suggested to those skilled in the art in actual practice, and the scope of the invention is intended to be covered by the spirit and substance of the following claims.

What I claim is:

1. In a speed changing device the combination of a rotatable member having gear teeth formed thereon, the leading edges on one side thereof being removed from a normal to its axis, a fixed member having teeth formed thereon whose leading edges on one side thereof are inwardly angularly disposed from the mid-point thereof, and an axially shiftable member comprising a pair of axially spaced gears having teeth the leading edges of which are normal to its axis for selective meshing engagement respectively with said fixed gear member at synchronous speeds thereof for either direction of rotation of the axially shiftable member and said rotatable gear member at synchronous speeds thereof for only one direction of rotation of the axially shiftable member.

2. In a transmission drive axle having a speed changing device the combination of a rotatable ring gear having internally disposed teeth formed thereon the leading edges of which are angularly disposed from a normal to its axis, a fixed ring gear having internally disposed teeth formed thereon whose leading edges are equi-angularly disposed from substantially the mid-point thereof, and a rotatable member mounting a pair of spaced sun gears each having teeth formed with leading edges normal to the axis of the gears for respective meshing engagement with said fixed ring gear at synchronous speeds thereof for either direction of rotation of the rotatable member and said rotatable ring gear at synchronous speeds thereof for only one direction of rotation of the rotatable member.

3. In a transmission drive axle having a speed changing device a combination of a rotatable ring gear having gear teeth the leading edges of which are inclined in one direction, a stationary ring gear having gear teeth the leading edges of which are oppositely inclined from the mid-point of the teeth, and a rotatable member having a pair of spaced different diameter sun gears each having gear teeth the leading edges of which are normal to its axis, said larger sun gear having meshing engagement with the stationary ring gear at synchronous speeds thereof for either direction of rotation of the rotatable member and the rotatable ring gear having meshing engagement with the other sun gear at synchronous speeds thereof for only one direction of rotation of the rotatable member.

4. In a transmission drive axle having a speed changing device the combination of a rotatable member having internally disposed gear teeth formed thereon the leading edges of which are inclined from a plane normal to its axis, a stationary member having internally disposed gear teeth formed thereon the leading edges of which are inclined in two directions from the mid-point of the teeth, and a second rotatable member having spaced gears formed thereon the leading edges of which lie in a plane normal to its axis said rotatable member being co-axially aligned with said first mentioned rotatable and fixed members and axially slidable relative thereto providing for meshing engagement with the stationary internally geared member when at synchronous speeds therewith for either direction of rotation and with the rotatable internally geared member at synchronous speeds therewith in only one direction of rotation so as to effect change speeds through the drive axle.

5. In a transmission drive axle having a speed changing device a combination of a rotatable member having axially spaced sun gears formed thereon each having gear teeth the leading edges of which are normal to the axis of rotation, a rotatable ring gear having gear teeth formed thereon the leading edges on one side thereof of which are inclined in a direction away from the direction of relative rotation from the rotatable member so as to provide for synchronous meshing engagement thereof with one of the sun gears for one direction of rotation of the rotatable member, and a stationary ring gear having gear teeth the leading edges on one side thereof of which are inclined in opposite directions away from the mid-point of the teeth so as to provide for synchronous meshing engagement thereof with the other sun gear for either direction of rotation of the rotatable member.

ROBERT C. RUSSELL.

REFERENCES CITED

The following references are of record in the file of this patent:

UNITED STATES PATENTS

| Number    | Name      | Date           |
|-----------|-----------|----------------|
| 1,277,652 | Seymour   | Sept. 3, 1918  |
| 1,497,845 | Evans     | June 17, 1924  |
| 1,623,212 | Starr     | Apr. 4, 1927   |
| 1,857,790 | Pasinski  | May 10, 1932   |
| 1,899,490 | Wiedmann  | Feb. 28, 1933  |
| 1,934,270 | Maynard   | Nov. 7, 1933   |
| 2,049,126 | Maybach   | July 28, 1936  |
| 2,071,165 | Harper    | Feb. 16, 1937  |
| 2,120,831 | Cotterman | June 14, 1938  |
| 2,218,314 | Johnson   | Oct. 15, 1940  |
| 2,220,463 | Sinclair  | Nov. 5, 1940   |
| 2,221,896 | Haigh     | Nov. 19, 1940  |